US 8,553,573 B2

(12) United States Patent
Sankhavaram

(10) Patent No.: US 8,553,573 B2
(45) Date of Patent: Oct. 8, 2013

(54) APPARATUS AND METHOD FOR ADAPTIVE THROTTLING OF TRAFFIC ACROSS MULTIPLE NETWORK NODES

(75) Inventor: Vasu Sasikanth Sankhavaram, Mt. View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 519 days.

(21) Appl. No.: 12/594,245

(22) PCT Filed: Apr. 4, 2008

(86) PCT No.: PCT/US2008/059396
§ 371 (c)(1),
(2), (4) Date: Oct. 1, 2009

(87) PCT Pub. No.: WO2008/127891
PCT Pub. Date: Oct. 23, 2008

(65) Prior Publication Data
US 2010/0135155 A1    Jun. 3, 2010

Related U.S. Application Data

(60) Provisional application No. 60/923,288, filed on Apr. 13, 2007.

(51) Int. Cl.
*H04J 1/16* (2006.01)
(52) U.S. Cl.
USPC .......................................... 370/252; 370/235
(58) Field of Classification Search
USPC .......... 370/229–235, 252, 401; 709/223–226
See application file for complete search history.

(56) References Cited

U.S. PATENT DOCUMENTS

| | | | | |
|---|---|---|---|---|
| 6,711,129 B1* | 3/2004 | Bauer et al. | ................... | 370/230 |
| 7,738,375 B1* | 6/2010 | Vinokour et al. | ............. | 370/232 |
| 8,176,203 B1* | 5/2012 | Liu et al. | ....................... | 709/238 |
| 2005/0025100 A1* | 2/2005 | Lee et al. | ...................... | 370/335 |
| 2006/0209693 A1* | 9/2006 | Davari et al. | .................. | 370/232 |

OTHER PUBLICATIONS

International Search Report and Written Opinion in co-pending, related PCT Application No. PCT?US2008/059396, mailed Aug. 6, 2008.
Mong-Fong Horng, et al., "Identification and Analysis of P2P Traffic—An Example of Bit Torrent", Innovative Computing, Information and Control, 2006, ICICIC '06. First International Conference on, vol. 2, No. 30, Aug. 2006, pp. 266-269.
Xiao, L., et al., "Improving unstructured peer-to-peer systems by adaptive connection establishment", Computers, IEEE Transactions on, vol. 54, Issue 9, Sep. 2005, pp. 1091-1103.
Bindal, R., et al., "Improving Traffic Locality in BitTorrent via Biased Neighbor Selection", Distributed Computing Systems, 2006, 26th IEEE International Conference, Jul. 4, 2006, pp. 66-75.

* cited by examiner

*Primary Examiner* — Kan Yuen

(57) ABSTRACT

One embodiment of a method of throttling network traffic comprises obtaining traffic rate data from available peer network nodes; computing a maximum permissible rate for a network node based on the traffic rate data from the peer network nodes, wherein the maximum permissible rate represents a maximum number of transactions permitted to pass into that network node for processing during a current period; and employing the maximum permissible rate to govern a number of transactions admitted for processing by the network node in the current period.

19 Claims, 10 Drawing Sheets

FIG. 2A

CONSERVATIVE

202 — $X = TV - \sum_{x=1}^{n-1} PR_x$

204 — IF $(X \leq 0)$

THEN

206 — $MPR = MTV = \left\lceil \frac{TV}{n} \right\rceil$

208 — IF $(X > 0)$

THEN

210 — $MPR = X$

AGGRESSIVE

212 — $X = TV - \sum_{x=1}^{n-1} PR_x$

214 — IF $(X \leq 0)$

THEN

216 — MPR = 0

218 — IF $(X > 0)$

THEN

220 — IF (PREV CYCLE MPR = 0 AND X = CURCYCLE TV)

THEN

222 — $MPR = MTV = \left| \frac{TV}{n} \right|$

224 — IF (PREV CYCLE MPR $\neq$ 0 OR X $\neq$ CURCYCLE TV)

THEN

226 — MPR = X

| CYCLE | MPR 312 | | | | ACTUAL 314 | | | | ALLOWED 316 | | | | TOTAL 318 |
|---|---|---|---|---|---|---|---|---|---|---|---|---|---|
| | A 328 | B 330 | C 332 | D 334 | A 336 | B 338 | C 340 | D 342 | A 344 | B 346 | C 348 | D 350 | |
| 1 | 12 | 12 | 12 | 12 | 3 | 3 | 3 | 3 | 3 | 3 | 3 | 3 | 12 |
| 2 | 3 | 3 | 3 | 3 | 4 | 5 | 6 | 7 | 3 | 3 | 3 | 3 | 12 |
| 3 | 3 | 3 | 3 | 3 | 2 | 3 | 4 | 5 | 2 | 3 | 3 | 3 | 11 |
| 4 | 3 | 4 | 4 | 4 | 2 | 3 | 4 | 5 | 2 | 3 | 4 | 4 | 13 |

FIG. 3

| CYCLE | MPR 404 | | | | ACTUAL 406 | | | | ALLOWED 408 | | | | TOTAL 410 |
|---|---|---|---|---|---|---|---|---|---|---|---|---|---|
| | A 412 | B 414 | C 416 | D 418 | A 420 | B 422 | C 424 | D 426 | A 428 | B 430 | C 432 | D 434 | |
| 1 | 12 | 12 | 12 | 12 | 12 | 13 | 14 | 15 | 12 | 12 | 12 | 12 | 48 |
| 2 | 3 | 3 | 3 | 3 | 12 | 13 | 14 | 15 | 3 | 3 | 3 | 3 | 12 |
| 3 | 3 | 3 | 3 | 3 | 2 | 3 | 2 | 3 | 2 | 3 | 2 | 3 | 10 |
| 4 | 4 | 5 | 4 | 5 | 5 | 5 | 5 | 5 | 4 | 5 | 4 | 5 | 18 |
| 5 | 3 | 3 | 3 | 3 | | | | | | | | | |

CONSERVATIVE

FIG. 4A

| CYCLE | MPR 448 | | | | ACTUAL 450 | | | | ALLOWED 452 | | | | TOTAL 454 |
|---|---|---|---|---|---|---|---|---|---|---|---|---|---|
| | A 456 | B 458 | C 460 | D 462 | A 464 | B 468 | C 470 | D 472 | A 474 | B 476 | C 478 | D 480 | |
| 1 | 12 | 12 | 12 | 12 | 4 | 3 | 2 | 2 | 4 | 3 | 2 | 2 | 9 |
| 2 | 5 | 4 | 3 | 3 | 2 | 2 | 2 | 2 | 2 | 2 | 2 | 2 | 8 |
| 3 | 6 | 6 | 6 | 6 | 2 | 2 | 2 | 2 | 2 | 2 | 2 | 2 | 8 |
| 4 | 6 | 6 | 6 | 6 | 6 | 6 | 6 | 6 | 6 | 6 | 6 | 6 | 24 |
| 5 | 3 | 3 | 3 | 3 | 6 | 6 | 6 | 6 | 3 | 3 | 3 | 3 | 12 |

CONSERVATIVE

FIG. 4B

| CYCLE | MPR 504 | | | | ACTUAL 506 | | | | ALLOWED 508 | | | | TOTAL 510 |
|---|---|---|---|---|---|---|---|---|---|---|---|---|---|
| | A 512 | B 514 | C 516 | D 518 | A 520 | B 522 | C 524 | D 526 | A 528 | B 530 | C 532 | D 534 | |
| 1 | 12 | 12 | 12 | 12 | 4 | 3 | 2 | 2 | 4 | 3 | 2 | 2 | 9 |
| 2 | 5 | 4 | 3 | 3 | 2 | 2 | 2 | 2 | 2 | 2 | 2 | 2 | 8 |
| 3 | 6 | 6 | 6 | 6 | 6 | 6 | 6 | 6 | 6 | 6 | 6 | 6 | 24 |
| 4 | 0 | 0 | 0 | 0 | 2 | 3 | 4 | 5 | 0 | 0 | 0 | 0 | 0 |
| 5 | 3 | 3 | 3 | 3 | 2 | 3 | 4 | 5 | 2 | 3 | 3 | 3 | 11 |

502 / 536 / 538 / 540 / 542 / 544

AGGRESSIVE

FIG. 5

APPARATUS AND METHOD FOR ADAPTIVE THROTTLING OF TRAFFIC ACROSS MULTIPLE NETWORK NODES

CROSS-REFERENCE TO RELATED APPLICATION

This is a U.S. national phase application which claims priority to PCT application entitled, "Apparatus and Methods for Adaptive Throttling of Traffic Across Multiple Network Nodes,", having serial number PCT/US2008/059396, filed Apr. 4, 2008, which claims priority to U.S. provisional application entitled, "Apparatus and Methods for Adaptive Throttling of Traffic Across Multiple Network Nodes," having Ser. No. 60/923,288, filed Apr. 13, 2007, which are both entirely incorporated herein by reference.

TECHNICAL FIELD

The present disclosure is generally related to computer networks and, more particularly, is related to managing network traffic.

BACKGROUND

In the computer art, users often need to employ the computing facilities of a service provider to satisfy their computing needs. For example, one or more users, each utilizing one or more applications, may contract with a service provider to request that the service provider perform transaction, processing using the service provider's computing facilities. For a variety of economic and technical reasons, the service provider typically employs a server farm that comprises of a plurality of servers to service the transaction requests from the users. In an example case, each user may contract with the service provider to require the service provider to provide a certain contracted processing rate or a contracted service level e.g. 1000 transactions per second, 100 transactions per second, and 10 transactions per second, etc.

Generally speaking, the service provider desires to provide at least the contracted transaction processing rate to each customer to keep the customers happy. However, there is also a strong need to manage the traffic (e.g., transactions) such that no user would be able to grossly abuse his contractual arrangement by vastly exceeding his contracted transaction processing rate. If the traffic is not properly managed by the service provider, the volume of incoming transactions may result in clogged traffic at the servers in the server farm. Due to the clogged traffic, transaction processing performance may be reduced, and a user who legitimately pays for his/her contracted transaction processing rate may not be able to satisfactorily process transactions, leading to reduced customer satisfaction.

SUMMARY

Embodiments of the present disclosure provide systems and methods of throttling network traffic. One embodiment, among others, of a method comprises obtaining traffic rate data from available peer network nodes; computing a maximum permissible rate for a network node based on the traffic rate data from the peer network nodes, wherein the maximum permissible rate represents a maximum number of transactions permitted to pass into that network node for processing during a current period; and employing the maximum permissible rate to govern a number of transactions admitted for processing by the network node in the current period.

Briefly described, one embodiment of a system of throttling network traffic, among others, comprises a peer communication module configured to obtain traffic rate data from available peer network nodes; a threshold stats module configured to compute a maximum permissible rate for a network node based on the traffic rate data from the peer network nodes, wherein the maximum permissible rate represents a maximum number of transactions permitted to pass into that network node for processing during a current period; and a gatekeeper module configured to employ the maximum permissible rate to govern a number of transactions admitted for processing by the network node in a current period.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 2A is a diagram depicting one implementation of conservative traffic throttling in accordance with one embodiment of the present disclosure.

FIG. 3 is a table diagram depicting an example of conservative adaptive throttling, whereby four rows represent four example cycles during which the traffic throttling is adaptively adjusted for each network node in accordance with one embodiment of the present disclosure.

FIG. 4A is a table diagram depicting an example of conservative adaptive throttling, whereby multiple rows represent example cycles during which the traffic throttling is adaptively adjusted for each network node in accordance with one embodiment of the present disclosure.

FIG. 4B is a table diagram depicting an example of conservative adaptive throttling, whereby multiple rows represent example cycles during which the traffic throttling is adaptively adjusted for each network node in accordance with one embodiment of the present disclosure.

FIG. 5 is a table diagram depicting an example of aggressive adaptive throttling, whereby multiple rows represent example cycles during which the traffic throttling is adaptively adjusted for each network node in accordance with one embodiment of the present disclosure.

DETAILED DESCRIPTION OF EMBODIMENTS

Figure 1:
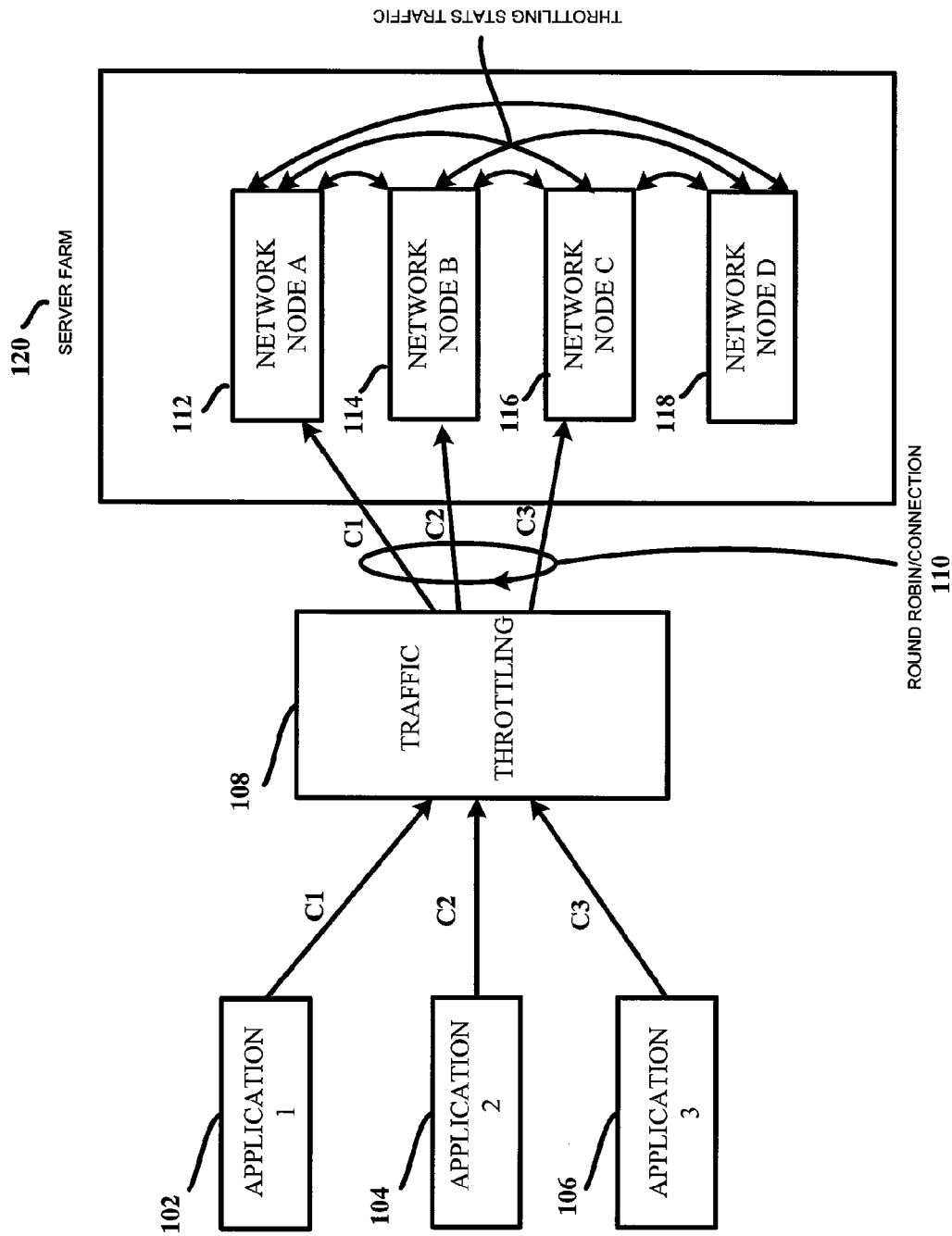
FIG. 1 is a block diagram showing an example of an environment that implements traffic throttling in accordance with the present disclosure.

The present disclosure will now be described in detail with reference to a few embodiments thereof as illustrated in the accompanying drawings. In the following description, numerous specific details are set forth in order to provide a thorough understanding of the present disclosure. It will be apparent, however, to one skilled in the art, that the present disclosure may be practiced without some or all of these specific details. In other instances, well known process steps and/or structures have not been described in detail in order to not unnecessarily obscure the present disclosure.

Various embodiments are described herein below, including methods and techniques. It should be kept in mind that the present disclosure might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the disclosure may also cover apparatuses for practicing embodiments of the present disclosure. Such apparatus may include circuits, dedicated and/or programmable, to carry out tasks pertaining to embodiments of the present disclosure. Examples of such apparatus include a general-purpose computer and/or a dedicated computing device when appropriately programmed and may include a combination of a computer/computing device and dedicated/programmable circuits adapted for the various tasks pertaining to embodiments of the present disclosure.

Embodiments of the present disclosure relate to apparatus and methods for implementing adaptive throttling across a plurality of network nodes (e.g., servers of a server farm). For example, traffic (e.g., transactions received by the individual network nodes of the server farm) may be adaptively throttled to control the amount of traffic admitted by the plurality of network nodes for processing. In accordance with the inventive adaptive throttling technique, the allowed traffic rate for each network node (i.e., the individual, specific rate at which transactions are admitted by each network node for processing) is adaptively controlled on a period-by-period or cycle-by-cycle basis instead of on a transaction-by-transaction basis.

Each period or cycle (the terms period and cycle are used synonymously herein) typically includes multiple transactions. During a given cycle of the adaptive throttling technique, each network node communicates with available peer network nodes to obtain traffic rate data from the peer network nodes. The obtained peer traffic rate data, among other data, enables a given network node to compute its own allowable threshold value. The allowable threshold value for that network node is then employed to govern the number of transactions admitted for processing by that network node in the current period. As will be discussed in details herein, this determination is based on the total threshold value of admitted transactions for the network nodes as a whole in the current cycle, and based on the traffic rates allowed in the last cycle for the peer network nodes.

By employing period-by-period adaptive throttling, the communication overhead required for coordinating traffic throttling across multiple network nodes is reduced. The reduction in network node communication overhead thus reduces network traffic usage and potential congestion. Concomitantly, network delay is reduced, and overall transaction processing performance is improved.

The features and advantages of the present disclosure may be better understood with reference to the figures and discussions that follow. FIG. 1 shows an example of an environment that implements traffic throttling. The environment of FIG. 1 includes, application 102, application 104, application 106, representing applications that send transactions to be processed to a server farm 120 via traffic throttling middleware 108. Traffic throttling middleware 108 employs a simple round-robin traffic distribution scheme 110 to deliver the transactions to be processed to network node 112, network node 114, network node 116, and/or network node 118.

In the example of FIG. 1, traffic throttling is performed by each individual network node 112, 114, 116, and 118 to control the amount of traffic that comes into each network node. A plurality of arrows on the right-hand side of FIG. 1 indicate that the network nodes communicate with one another to exchange data that facilitates the traffic throttling.

As shown in FIG. 1, application 102, application 104, and application 106 forward transactions C1, C2, and C3 respectively to server farm 120 for processing. Before transactions C1, C2, and C3 reach server farm 120, transactions C1, C2, and C3 traverses traffic throttling middleware 108. Traffic throttling middleware 108 analyzes the network traffic as well as the processing capabilities and performance of network node 112, network node 114, network node 116, and network node 118 to determine which network node is available to process one or more of transactions C1, C2, and C3. Once this determination is made, a connection is created with the network node(s) determined to be available so that one or more of transactions C1, C2, and C3 may then be forwarded on to their designated network node for processing.

At each network node, a gatekeeper function is implemented to throttle incoming traffic to ensure that transaction processing performance is maximized. Although the examples herein will be discussed in connection with traffic throttling at the network nodes, it should be kept in mind that this traffic throttling function can be readily implemented by one skilled in the art given this disclosure at any suitable functional component in the network, including for example at the applications, at routers or switches in the network, in the middleware layer, etc.

Figure 2B:
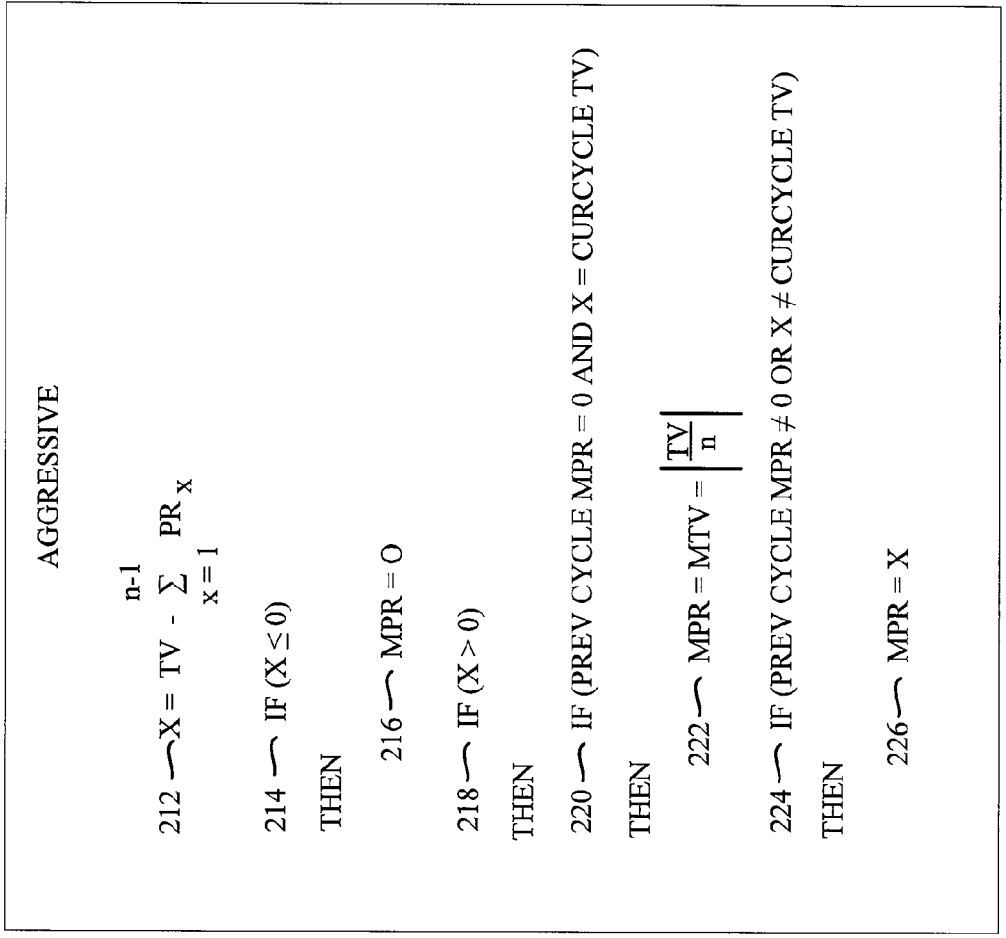
FIG. 2B is a diagram depicting one implementation of aggressive traffic throttling in accordance with one embodiment of the present disclosure.

FIG. 2A and FIG. 2B show, in accordance with embodiments of the present disclosure, two different implementations of traffic throttling. In FIG. 2A, traffic throttling is conservative and greater latitude is given, In FIG. 2B, traffic throttling is aggressive, i.e., more restrictive.

With reference to FIG. 2A, a temporary variable X is employed to facilitate the calculation of the Maximum Permissible Rate, or MPR, for each network node for the current cycle. The MPR for a particular network node represents the maximum number of transactions permitted to pass into that network node for processing during the current cycle. In the conservative case (FIG. 2A), as can be seen by reference number 202, the temporary variable X equals to the threshold value set for the group of network nodes (e.g., the server farm or a logical unit thereof that comprises multiple servers) minus the sum of allowed traffic rate for all peer network nodes in the previous cycle. The threshold value is typically configurable and is set for the group of network nodes as a whole. The allowed traffic rate for a given peer network node in the previous cycle represents the number of transactions allowed to pass through to be processed by that given peer network node in the previous cycle.

Note that this allowed traffic rate may at times differ from the actual traffic rate that arrives at the peer network node awaiting processing. For example, 15 transactions may arrive at a given network node but only 8 transactions may be admitted for processing in a given cycle. In this case, the actual traffic rate is 15 (signifying the number of transactions actually received by the network node) while the allowed traffic rate is 8 (signifying the number of transactions allowed to pass into the network node for processing by the network node's processing logic).

Thus, as can be seen by reference number 202, $$X = TV - \sum_{x=1}^{n-1} PR_x,$$

where TV equals to the threshold value for the plurality of network nodes, n represents the number of network nodes, and PRx represents the peer allowed traffic rate in the previous cycle for a given network node x.

If temporary variable X≤0 (the condition shown by reference number 204), then MPR=MTV, wherein the Maximum Threshold Value, or MTV, is defined as $$\left| \frac{TV}{n} \right|.$$

On the other hand, if temporary variable X>0 (as shown by reference number 208), then MPR=the value of temporary variable X.

The steps of FIG. 2A will be explained in details with reference to a few examples that follow.

Turning now to the aggressive throttling case (FIG. 2B), as can be seen by reference number 212, temporary variable X is calculated the same way, i.e., $$X = TV - \sum_{x=1}^{n-1} PR_x.$$

When X≤0 (the condition shown by reference number 214), MPR=0 (as shown by reference number 216). In the other words, unlike the conservative throttling case, aggressive throttling shuts down the MPR value to zero when the temporary variable is less than or equal to zero. However, if X>0 (the condition shown by reference number 218), the following considerations apply. If the MPR for this network node in the previous cycle is zero and the temporary variable X=TV for the current cycle (the condition shown by reference number 220), then MPR=MTV, wherein MTV is again equal to $$\left| \frac{TV}{n} \right|$$

(as shown by reference number 222). On the other hand, if the MPR for the previous cycle is not zero or the temporary variable X≠TV for the current cycle (the condition shown by reference number 224), then MPR=temporary variable X (as shown by reference number 226).

The Tables that follow provide examples of the aggressive and conservative traffic throttling.

FIG. 3 shows, in accordance with an embodiment of the present disclosure, an example of conservative adaptive throttling. There are shown in FIG. 3 four rows, representing four example cycles during which the traffic throttling is adaptively adjusted for each network node. In the example of FIG. 3, the threshold value (TV) for the four network nodes A, B, C, and D is arbitrarily pre-configured to be 12 for explanation purposes. According, the MTV value is 3 since MTV is again equal to $$\left| \frac{TV}{n} \right|.$$

Time is set to be UNIX time since 1970 for ease of calculation, and a cycle is defined to be (time) minus (time percentage duration), where the percentage indicates a remainder operation.

As shown in the Table of FIG. 3, under the column "MPR" (312) and in the cycle 1 row, the Maximum Permissible Rate (MPR) for network node A (328), network node B (330), network node C (332), and network node D (334) are initially set to be 12 i.e. the maximum default TV. This is to accommodate the possible situation where one of the network nodes may receive all the traffic, and thus the threshold should be set high to indicate that it is permissible to allow any given network node to allow in the maximum threshold value of transactions (e.g., if other network nodes receives no traffic).

Under the column "ACTUAL" (314) and in the cycle 1 row, the value "3" represents the number of transactions actually received by the Transaction Throttling Mechanism, or "TTM", of a given network node. This actual value represents for network node A the number of transactions transmitted by the plurality of applications and destined to be processed by network node A (336) during cycle 1. In this example, the actual value measured for the number of transactions destined for network node B (338) is 3. The actual value measured for the number of transactions destined for network node C (340) is 3. The actual value measured for the number of transactions destined for network node D (342) is 3. Note that these actual transaction values represent only transactions received at the various network nodes in a given cycle (e.g., cycle 1 as indicated by row 1). The number of transactions actually allowed in to be processed at each network node during that cycle will be computed as follows to implement traffic throttling.

As can be seen in FIG. 3, in the cycle 1 row, under the column "ALLOWED" (316) and under network node A (344), the value "3" represents the number of transactions that the TTM actually allows to be admitted to be processed by network node A during cycle 1. The allowed number of transactions processed by network node B (346) is 3. The allowed number of transactions processed by network node C (348) is 3. The allowed number of transactions processed by network node D (350) is 3. This is because there are 3 transactions actually received at each network node, and the threshold for each network node was set to 12. Since the number of transactions actually received is less than the MPR for each of network nodes A, B, C, and D during cycle 1, all actually received transactions are allowed to pass through for processing.

Furthermore, under the column "TOTAL" (318) and the cycle 1 row, the value therein represents the total number of transactions that is admitted during the current cycle by all network nodes for processing. The total number of transactions actually admitted for processing during cycle 1 is calculated to be 12.

It should be understood that this total allowed transaction value is not the total number of transactions actually being processed by the plurality of network nodes during a given cycle. The total allowed transaction value is the additional number of transactions passed or admitted to the plurality of network nodes for processing during the cycle. Since it is possible that the plurality of network nodes may be processing other transactions allowed in one or more previous cycles, the total number of transactions actually processed by the plurality of network nodes during a given cycle may be greater than the total allowed transaction value for that cycle. For cycle 1, since there was no previous cycle and no pending transactions being processed, the total number of transactions actually processed by the plurality of network nodes during cycle 1 equals the number of transactions allowed during cycle 1. However, such will not always be the case in subsequent cycles.

As shown in the Table of FIG. 3, under the column "MPR" (312) and in the cycle 2 row, the Maximum Permissible Rate (MPR) for network node A (328) is calculated to be 3. This MPR is calculated using the formulas of FIG. 2A. For example, the temporary variable X for network node A is 12−9 or 3, and thus MPR for network node A is 3. The Maximum Permissible Rate (MPR) for network node B (330) is similarly calculated to be 3. The Maximum Permissible Rate (MPR) for network node C (332) is calculated to be 3, and the Maximum Permissible Rate (MPR) for network node D (334) is calculated to be 3.

Furthermore, under the column "ACTUAL" (314) and in the cycle 2 row, the value "4" represents the number of transactions actually received by the Transaction Throttling Mechanism, or "TTM", which number of transactions represents the transactions transmitted by the plurality of applications to be processed by network node A (336) during cycle 2. In this example, the actual value measured for the number of transactions destined for network node B (338) is 5 during cycle 2. The actual value measured for the number of transactions destined for network node C (340) is 6 during cycle 2. The actual value measured for the number of transactions destined for network node D (342) is 7 during cycle 2.

Furthermore, as can be seen in FIG. 3, in the cycle 2 row, under the column "ALLOWED" (316) and under network node A (344), the value "3" represents the number of transactions that the TTM actually allows to be processed by network node A during cycle 2. Note that even though the number of transactions actually received is 4 for network node A during cycle 2, the MPR is only 3, and thus only the first 3 transactions are admitted for processing. Generally speaking, when only a subset number of transactions that arrive at a network node is admitted for processing during a cycle, the transactions are admitted on a first-come-first-served basis, in an embodiment.

The allowed number of transactions processed by network node B (346) is 3 during cycle 2 since the number of transactions actually received (5) is greater than the MPR (3) for network node B during cycle 2. Likewise, the allowed number of transactions processed by network node C (348) is 3 during cycle 2. The allowed number of transactions processed by network node D (350) is also 3 during cycle 2.

Furthermore, under the column "TOTAL" (318) and the cycle 2 row, the value represents the total number of transactions admitted to be processed by all network nodes during cycle 2. The total value of transactions actually allowed for cycle 2 is calculated to be 12. Again, it should be understood that this total allowed transaction value is not the total number of transactions actually processed by the plurality of network nodes during cycle 2. The total allowed transaction value is the additional number of transactions passed to the plurality of network nodes for processing during cycle 2. Since it is possible that the plurality of network nodes may be processing other transactions allowed in one or more previous cycles, the total number of transactions actually processed by the plurality of network nodes during cycle 2 may be greater than the total allowed transaction value shown in FIG. 3 for cycle 2.

As shown in the Table of FIG. 3, under the column "MPR" (312) and in the cycle 3 row, the Maximum Permissible Rate (MPR) for network node A (328) is calculated to be 3. This MPR is calculated using the formulas of FIG. 2A. The Maximum Permissible Rate (MPR) for network node B (330) is calculated to be 3. The Maximum Permissible Rate (MPR) for network node C (332) is calculated to be 3 and the Maximum Permissible Rate (MPR) for network node D (334) is calculated to be 3.

Furthermore, under the column "ACTUAL" (314) and in the cycle 3 row, the value "2" represents the number of transactions actually received by the Transaction Throttling Mechanism, or "TTM", which number of transactions represents the transactions transmitted by the plurality of applications to be processed by network node A (336) during cycle 3. In this example, the actual value measured for the number of transactions destined for network node B (338) is 3 during cycle 3. The actual value measured for the number of transactions destined for network node C (340) is 4 during cycle 3. The actual value measured for the number of transactions destined for network node D (342) is 5 during cycle 3.

Furthermore, as can be seen in FIG. 3, in the cycle 3 row, under the column "ALLOWED" (316) and under network node A (344), the value "2" represents the number of transactions that the TTM actually allows to be processed by network node A during cycle 3. The allowed number of transactions processed by network node B (346) is 3. The allowed number of transactions processed by network node C (348) is 3. The allowed number of transactions processed by network node D (350) is 3. For any particular network node, the allowed number of transactions is the lesser of the actual number of transactions received and the MPR for that network node during a given cycle.

Furthermore, under the column "TOTAL" (318) and the cycle 3 row, the value 11 represents the total number of transactions admitted to be processed by all network nodes during cycle 3.

As shown in the Table of FIG. 3, under the column "MPR" (312) and in the cycle 4 row, the Maximum Permissible Rate (MPR) for network node A (328) is calculated to be 3. This MPR is calculated using the formulas of FIG. 2A. The Maximum Permissible Rate (MPR) for network node B (330) is calculated to be 4. The Maximum Permissible Rate (MPR) for network node C (332) is calculated to be 4 and the Maximum Permissible Rate (MPR) for network node D (334) is calculated to be 4.

Furthermore, under the column "ACTUAL" (314) and in the cycle 4 row, the value "2" represents the number of transactions actually received by the Transaction Throttling Mechanism, or "TTM", which number of transactions represents the transactions transmitted by the plurality of applications to be processed by network node A (336) during cycle 4. In this example, the actual value measured for the number of transactions destined for network node B (338) is 3 during cycle 4. The actual value measured for the number of transactions destined for network node C (340) is 4 during cycle 4.

The actual value measured for the number of transactions destined for network node D (342) is 5 during cycle 4.

Furthermore, as can be seen in FIG. 3, in the cycle 4 row, under the column "ALLOWED" (316) and under network node A (344), the value "2" represents the number of transactions that the TTM actually allows to be processed by network node A during cycle 4. The allowed number of transactions processed by network node B (346) is 3. The allowed number of transactions processed by network node C (348) is 4. The allowed number of transactions processed by network node D (350) is 4. For any particular network node, the allowed number of transactions is the lesser of the actual number of transactions received and the MPR for that network node during a given cycle.

Furthermore, under the column "TOTAL" (318) and the cycle 4 row, the value 13 represents the total number of transactions admitted to be processed by all network nodes during cycle 4. The total value of transactions actually allowed for cycle 4 is calculated to be 13.

As it can be seen in FIG. 3, the values in the column "TOTAL" represent the total number of transactions admitted to be processed by all network nodes. In cycle 1 the total number of transactions admitted to be processed is 12. In cycle 2 the total number of transaction admitted to be processed is 12. In cycle 3 the total number of transactions admitted to be processed is 11. Finally, in cycle 4 the total number of transactions admitted to be processed is 13.

As shown with the example of FIG. 3, adaptive throttling on a period-by-period basis can effectively control the traffic load across multiple network nodes. This is because over a period of time the total number of transactions actually admitted for processing will average out to be about the threshold default (e.g., 12 in the example of FIG. 3). Furthermore, the amount of data exchanged among the network nodes to accomplish adaptive throttling is fairly minimal since only the peer allowed rate in the previous cycle is exchanged. Accordingly, network bandwidth overhead is minimized, leading to improved performance.

The Table of FIG. 4A shows, in accordance with an embodiment of the present disclosure, another example of conservative adaptive throttling. In this example, TV is again 12.

As shown in the Table of FIG. 4A, under the column "MPR" (404) and in the cycle 1 row, the Maximum Permissible Rate (MPR) for network node A (412), network node B (414), network node C (416), and network node D (418) are set to be 12 i.e. the maximum default. Furthermore, under the column "ACTUAL" (406) and in the cycle 1 row, the value "12" represents the number of transactions actually received by the Transaction Throttling Mechanism, or "TTM", which number of transactions represents the transactions transmitted by the plurality of applications to be processed by network node A (420) during cycle 1. In this example, the actual value measured for the number of transactions destined for network node B (422) is 13. The actual value measured for the number of transactions destined for network node C (424) is 14. The actual value measured for the number of transactions destined for network node D (426) is 15.

Furthermore, as can be seen in FIG. 4A, in the cycle 1 row, under the column "ALLOWED" (408) and under network node A, the value "12" represents the number of transactions that the TTM actually allows to be processed by network node A (428) during cycle 1. The allowed number of transactions processed by network node B (430) is 12. The allowed number of transactions processed by network node C (432) is 12. The allowed number of transactions processed by network node D (434) is 12. For any particular network node, the allowed number of transactions is the lesser of the actual number of transactions received and the MPR for that network node during a given cycle.

Furthermore, under the column "TOTAL" (410) and the cycle 1 row, the value 48 represents the total number of transactions admitted to be processed by all network network nodes. The total value of transactions actually allowed for cycle 1 is calculated to be 48. In this case, all network nodes admit for processing the maximum number of transactions set by the TV during cycle 1.

As shown in the Table of FIG. 4A, under the column "MPR" (404) and in the cycle 2 row, the Maximum Permissible Rate (MPR) for network node A (412) is calculated to be 3. The Maximum Permissible Rate (MPR) for network node B (414) is calculated to be 3. The Maximum Permissible Rate (MPR) for network node C (416) is calculated to be 3 and the Maximum Permissible Rate (MPR) for network node D (418) is calculated to be 3. These calculations are performed using the formulas of FIG. 2A.

Furthermore, under the column "ACTUAL" (406) and in the cycle 2 row, the value "12" represents the number of transactions actually received by the Transaction Throttling Mechanism, or "TTM", which number of transactions represents the transactions transmitted by the plurality of applications to be processed by network node A (420) during cycle 2. In this example, the actual value measured for the number of transactions destined for network node B (422) is 13. The actual value measured for the number of transactions destined for network node C (424) is 14. The actual value measured for the number of transactions destined for network node D (426) is 15.

Furthermore, as can be seen in FIG. 4A, in the cycle 2 row, under the column "ALLOWED" (408) and under network node A (428), the value "3" represents the number of transactions that the TTM actually allows to be processed by network node A during cycle 2. The allowed number of transactions processed by network node B (430) is 3. The allowed number of transactions processed by network node C (432) is 3. The allowed number of transactions processed by network node D (434) is 3. For any particular network node, the allowed number of transactions is the lesser of the actual number of transactions received and the MPR for that network node during a given cycle.

Furthermore, under the column "TOTAL" (410) and the cycle 2 row, the value represents the total number of transactions admitted to be processed by all network nodes. The total value of transactions actually allowed for cycle 2 is calculated to be 12.

As shown in the Table of FIG. 4A, under the column "MPR" (404) and in the cycle 3 row, the Maximum Permissible Rate (MPR) network node A (412) is calculated to be 3. The Maximum Permissible Rate (MPR) for network node B (414) is calculated to be 3. The Maximum Permissible Rate (MPR) for network node C (416) is calculated to be 3 and the Maximum Permissible Rate (MPR) for network node D (418) is calculated to be 3. These calculations are performed using the formulas of FIG. 2A.

Furthermore, under the column "ACTUAL" (406) and in the cycle 3 row, the value "2" represents the number of transactions actually received by the Transaction Throttling Mechanism, or "TTM", which number of transactions represents the transactions transmitted by the plurality of applications to be processed by network node A (420) during cycle 2. In this example, the actual value measured for the number of transactions destined for network node B (422) is 3. The actual value measured for the number of transactions destined for network node C (424) is 2. The actual value measured for the number of transactions destined for network node D (426) is 3.

Furthermore, as can be seen in FIG. 4A, in the cycle 3 row, under the column "ALLOWED" (408) and under network node A, the value "2" represents the number of transactions that the TTM actually allows to be processed by network node A (428) during cycle 3. The allowed number of transactions processed by network node B (430) is 3. The allowed number of transactions processed by network node C (432) is 2. The allowed number of transactions processed by network node D (434) is 3. For any particular network node, the allowed number of transactions is the lesser of the actual number of transactions received and the MPR for that network node during a given cycle.

Furthermore, under the column "TOTAL" (410) and the cycle 3 row, the value represents the total number of transactions admitted to be processed by all network nodes. The total value of transactions actually allowed for cycle 3 is calculated to be 10.

As shown in the Table of FIG. 4A, under the column "MPR" (404) and in the cycle 4 row, the Maximum Permissible Rate (MPR) for network node A (412) is calculated to be 4. The Maximum Permissible Rate (MPR) for network node B (414) is calculated to be 5. The Maximum Permissible Rate (MPR) for network node C (416) is calculated to be 4 and the Maximum Permissible Rate (MPR) for network node D (418) is calculated to be 5.

Furthermore, under the column "ACTUAL" (406) and in the cycle 4 row, the value "5" represents the number of transactions actually received by the Transaction Throttling Mechanism, or "TIM", which number of transactions represents the transactions transmitted by the plurality of applications to be processed by network node A during cycle 4 (420). In this example, the actual value measured for the number of transactions destined for network node B (422) is 5. The actual value measured for the number of transactions destined for network node C (424) is 5. The actual value measured for the number of transactions destined for network node D (426) is 5.

Furthermore, as can be seen in FIG. 4A, in the cycle 4 row, under the column "ALLOWED" (408) and under network node A, the value "4" represents the number of transactions that the TTM actually allows to be processed by network node A (428) during cycle 4. The allowed number of transactions processed by network node B (430) is 5. The allowed number of transactions processed by network node C (432) is 4. The allowed number of transactions processed by network node D (434) is 5. For any particular network node, the allowed number of transactions is the lesser of the actual number of transactions received and the MPR for that network node during a given cycle.

Furthermore, under the column "TOTAL" (410) and the cycle 4 row, the value represents the total number of transactions admitted to be processed by all network nodes during cycle 4. The total value of transactions actually allowed for cycle 4 is calculated to be 18.

As shown in the Table of FIG. 4A, under the column "MPR" (404) and in the cycle 5 row, the Maximum Permissible Rate (MPR) for network node A (412) is calculated to be 3. The Maximum Permissible Rate (MPR) for network node B (414) is calculated to be 3. The Maximum Permissible Rate (MPR) for network node C (416) is calculated to be 3 and the Maximum Permissible Rate (MPR) for network node D (418) is calculated to be 3. These calculations are performed using the formulas of FIG. 2A.

As it can be seen in FIG. 4A, the values in the column "TOTAL" (410) represent the total number of transactions admitted to be processed by all network nodes. In cycle 1 the total number of transactions admitted to be processed is 48. In cycle 2 the total number of transaction processed is 12. In cycle 3 the total number of transactions admitted to be processed is 10. Finally, in cycle 4 the total number of transactions admitted to be processed is 18.

As shown with the example of FIG. 4A, adaptive throttling on a period-by-period basis can effectively control the traffic load across multiple network nodes. This is because over a period of time the total number of transactions actually admitted for processing will average out to be about the threshold default (e.g., 12 in the example of FIG. 4A). Again, the amount of data exchanged among the network nodes to accomplish adaptive throttling is fairly minimal since only the peer allowed rate in the previous cycle is exchanged. Accordingly, network bandwidth overhead is minimized, leading to improved performance.

The Table of FIG. 4B shows, in accordance with an embodiment of the present disclosure, another example of conservative adaptive throttling. In the example of FIG. 4B, the threshold value for the plurality of network nodes, or TV, is again 12.

As shown in the Table of FIG. 4B, under the column "MPR" (448) and in the cycle 1 row, the Maximum Permissible Rate (MPR) for network node A (456), network node B (458), network node C (460), and network node D (462) is initially set to be 12 for each, i.e. the maximum default TV.

Furthermore, under the column "ACTUAL" (450) and in the cycle 1 row, the value "4" represents the number of transactions actually received by the Transaction Throttling Mechanism, or "TTM", which number of transactions represents the transactions transmitted by the plurality of applications to be processed by network node A (464) during cycle 1. In this example, the actual value measured for the number of transactions destined for network node B (468) is 3. The actual value measured for the number of transactions destined for network node C (470) is 2. The actual value measured for the number of transactions destined for network node D (472) is 2.

Furthermore, as can be seen in FIG. 4B, in the cycle 1 row, under the column "ALLOWED" (452) and under network node A (474), the value "4" represents the number of transactions that the TTM actually allows to be processed by network node A during cycle 1. The allowed number of transactions processed by network node B (476) is 3. The allowed number of transactions processed by network node C (478) is 2. The allowed number of transactions processed by network node D (480) is 2. For any particular network node, the allowed number of transactions is the lesser of the actual number of transactions received and the MPR for that network node during a given cycle.

Furthermore, under the column "TOTAL" (454) and the cycle 1 row, the value represents the total number of transactions admitted to be processed by all network nodes. The total value of transactions actually allowed for cycle 1 is calculated to be 9.

As shown in the Table of FIG. 4B, under the column "MPR" (448) and in the cycle 2 row, the Maximum Permissible Rate (MPR) for network node A (456) is calculated to be 5. The Maximum Permissible Rate (MPR) for network node B (458) is calculated to be 4. The Maximum Permissible Rate (MPR) for network node C (460) is calculated to be 3 and the Maximum Permissible Rate (MPR) for network node D (462) is calculated to be 3. These values are calculated using the formulas of FIG. 2A.

Furthermore, under the column "ACTUAL" (450) and in the cycle 2 row, the value "2" represents the number of transactions actually received by the Transaction Throttling Mechanism, or "TTM", which number of transactions represents the transactions transmitted by the plurality of applications to be processed by network node A (464) during cycle 2. In this example, the actual value measured for the number of transactions destined for network node B (468) is 2. The actual value measured for the number of transactions destined for network node C (470) is 2. The actual value measured for the number of transactions destined for network node D (472) is 2.

Furthermore, as can be seen in FIG. 4B, in the cycle 2 row, under the column "ALLOWED" (452) and under network node A (474), the value "2" represents the number of transactions that the TTM actually allows to be processed by network node A during cycle 2. The allowed number of transactions processed by network node B (476) is 2. The allowed number of transactions processed by network node C (478) is 2. The allowed number of transactions processed by network node D (480) is 2. For any particular network node, the allowed number of transactions is the lesser of the actual number of transactions received and the MPR for that network node during a given cycle.

Furthermore, under the column "TOTAL" (454) and the cycle 2 row, the value represents the total number of transactions admitted to be processed by all network nodes. The total value of transactions actually allowed for cycle 2 is calculated to be 8.

As shown in the Table of FIG. 4B, under the column "MPR" (448) and in the cycle 3 row, the Maximum Permissible Rate (MPR) for network node A (456) is calculated to be 6. The Maximum Permissible Rate (MPR) for network node B (458) is calculated to be 6. The Maximum Permissible Rate (MPR) for network node C (460) is calculated to be 6 and the Maximum Permissible Rate (MPR) for network node D (462) is calculated to be 6.

Furthermore, under the column "ACTUAL" (450) and in the cycle 3 row, the value "2" represents the number of transactions actually received by the Transaction Throttling Mechanism, or "TTM", which number of transactions represents the transactions transmitted by the plurality of applications to be processed by network node A (464) during cycle 2. In this example, the actual value measured for the number of transactions destined for network node B (468) is 2. The actual value measured for the number of transactions destined for network node C (470) is 2. The actual value measured for the number of transactions destined for network node D (472) is 2.

Furthermore, as can be seen in FIG. 4B, in the cycle 3 row, under the column "ALLOWED" (452) and under network node A (474), the value "2" represents the number of transactions that the TTM actually allows to be processed by network node A during cycle 3. The allowed number of transactions processed by network node B (476) is 2. The allowed number of transactions processed by network node C (478) is 2. The allowed number of transactions processed by network node D (480) is 2. For any particular network node, the allowed number of transactions is the lesser of the actual number of transactions received and the MPR for that network node during a given cycle Furthermore, under the column "TOTAL" (454) and the cycle 3 row, the value represents the total number of transactions admitted to be processed by all network nodes. The total value of transactions actually allowed for cycle 3 is calculated to be 8.

As shown in the Table of FIG. 4B, under the column "MPR" (448) and in the cycle 4 row, the Maximum Permissible Rate (MPR) for network node A (456) is calculated to be 6. The Maximum Permissible Rate (MPR) for network node B (458) is calculated to be 6. The Maximum Permissible Rate (MPR) for network node C (460) is calculated to be 6 and the Maximum Permissible Rate (MPR) for network node D (462) is calculated to be 6. Furthermore, under the column "ACTUAL" (450) and in the cycle 4 row, the value "6" represents the number of transactions actually received by the Transaction Throttling Mechanism, or "TTM", which number of transactions represents the transactions transmitted by the plurality of applications to be processed by network node A (464) during cycle 4. In this example, the actual value measured for the number of transactions destined for network node B (468) is 6. The actual value measured for the number of transactions destined for network node C (470) is 6. The actual value measured for the number of transactions destined for network node D (472) is 6.

Furthermore, as can be seen in FIG. 4B, in the cycle 4 row, under the column "ALLOWED" (452) and under network node A (474), the value "6" represents the number of transactions that the TTM actually allows to be processed by network node A during cycle 4. The allowed number of transactions processed by network node B (476) is 6. The allowed number of transactions processed by network node C (478) is 6. The allowed number of transactions processed by network node D (480) is 6. For any particular network node, the allowed number of transactions is the lesser of the actual number of transactions received and the MPR for that network node during a given cycle Furthermore, under the column "TOTAL" (454) and the cycle 4 row, the value represents the total number of transactions admitted to be processed by all network nodes. The total value of transactions actually allowed for cycle 4 is calculated to be 24.

As shown in the Table of FIG. 4B, under the column "MPR" (448) and in the cycle 5 row, the Maximum Permissible Rate (MPR) for network node A (456) is calculated to be 3. The Maximum Permissible Rate (MPR) for network node B (458) is calculated to be 3. The Maximum Permissible Rate (MPR) for network node C (460) is calculated to be 3 and the Maximum Permissible Rate (MPR) for network node D (462) is calculated to be 3. Furthermore, under the column "ACTUAL" (450) and in the cycle 4 row, the value "6" represents the number of transactions actually received by the Transaction Throttling Mechanism, or "TTM", which number of transactions represents the transactions transmitted by the plurality of applications to be processed by network node A (464) during cycle 5. In this example, the actual value measured for the number of transactions destined for network node B (468) is 6. The actual value measured for the number of transactions destined for network node C (470) is 6. The actual value measured for the number of transactions destined for network node D (472) is 6.

Furthermore, as can be seen in FIG. 4B, in the cycle 5 row, under the column "ALLOWED" (452) and under network node A (474), the value "3" represents the number of transactions that the TTM actually allows to be processed by network node A during cycle 5. The allowed number of transactions processed by network node B (476) is 3. The allowed number of transactions processed by network node C (478) is 3. The allowed number of transactions processed by network node D (480) is 3. For any particular network node, the allowed number of transactions is the lesser of the actual number of transactions received and the MPR for that network node during a given cycle Furthermore, under the column "TOTAL" (454) and the cycle 5 row, the value represents the total number of transactions admitted to be processed by all network nodes. The total value of transactions actually allowed for cycle 5 is calculated to be 12.

As it can be seen in FIG. 4B, the values in the column "TOTAL" represent the total number of transactions admitted to be processed by all network nodes. In cycle 1 the total number of transactions admitted to be processed is 9. In cycle 2 the total number of transaction processed is 8. In cycle 3 the total number of transactions admitted to be processed is 8. In cycle 4 the total number of transactions admitted to be processed is 24. Finally, in cycle 5 the total number of transactions admitted to be processed is 12.

As shown with the example of FIG. 4B, conservative adaptive throttling on a cycle-by-cycle basis can effectively control load balancing across multiple network nodes, because over a period of time the total number of transactions actually admitted to be processed will average out to be the threshold default value.

The Table of FIG. 5 shows, in accordance with an embodiment of the present disclosure, an example of aggressive adaptive throttling. For ease of explanation, the total threshold value (TV) is again set to be 12.

As shown in the Table of FIG. 5, under the column "MPR" (504) and in the cycle 1 row, the Maximum Permissible Rate (MPR) for network node A (512), network node B (514), network node C (516), and network node D (518) is initially set to be 12 for each network node, i.e. the maximum default TV. Furthermore, under the column "ACTUAL" (506) and in the cycle 1 row, the value "4" represents the number of transactions actually received by the Transaction Throttling Mechanism, or "TTM", which number of transactions represents the transactions transmitted by the plurality of applications to be processed by network node A (520) during cycle 1. In this example, the actual value measured for the number of transactions destined for network node B (522) is 3. The actual value measured for the number of transactions destined for network node C (524) is 2. The actual value measured for the number of transactions destined for network node D (526) is 2.

Furthermore, as can be seen in FIG. 5, in the cycle 1 row, under the column "ALLOWED" (508) and under network node A, the value "4" represents the number of transactions that the TTM actually allows to be processed by network node A (528) during cycle 1. The allowed number of transactions processed by network node B (530) is 3. The allowed number of transactions processed by network node C (532) is 2. The allowed number of transactions processed by network node D (534) is 2. For any particular network node, the allowed number of transactions is the lesser of the actual number of transactions received and the MPR for that network node during a given cycle Furthermore, under the column "TOTAL" (510) and the cycle 1 row, the value represents the total number of transactions admitted to be processed by all network nodes. The total value of transactions actually allowed for cycle 1 is calculated to be 9.

As shown in the Table of FIG. 5, under the column "MPR" (504) and in the cycle 2 row, the Maximum Permissible Rate (MPR) for network node A (512) is calculated to be 5. The Maximum Permissible Rate (MPR) for network node B (514) is calculated to be 4. The Maximum Permissible Rate (MPR) for network node C (516) is calculated to be 3 and the Maximum Permissible Rate (MPR) for network node D (518) is calculated to be 3. These values are calculated using the formulas of FIG. 2B (i.e., the aggressive throttling case).

Furthermore, under the column "ACTUAL" (506) and in the cycle 2 row, the value "2" represents the number of transactions actually received by the Transaction Throttling Mechanism, or "TIM", which number of transactions represents the transactions transmitted by the plurality of applications to be processed by network node A (520) during cycle 2. In this example, the actual value measured for the number of transactions destined for network node B (522) is 2. The actual value measured for the number of transactions destined for network node C (524) is 2. The actual value measured for the number of transactions destined for network node D (526) is 2.

Furthermore, as can be seen in FIG. 5, in the cycle 2 row, under the column "ALLOWED" 508 and under network node A, the value "2" represents the number of transactions that the TTM actually allows to be processed by network node A (528) during cycle 2. The allowed number of transactions processed by network node B (530) is 2. The allowed number of transactions processed by network node C (532) is 2. The allowed number of transactions processed by network node D (534) is 2. For any particular network node, the allowed number of transactions is the lesser of the actual number of transactions received and the MPR for that network node during a given cycle.

Furthermore, under the column "TOTAL" (510) and the cycle 2 row, the value represents the total number of transactions admitted to be processed by all network nodes. The total value of transactions actually allowed for cycle 2 is calculated to be 8.

As shown in the Table of FIG. 5, under the column "MPR" (504) and in the cycle 3 row, the Maximum Permissible Rate (MPR) for network node A (512) is calculated to be 6. The Maximum Permissible Rate (MPR) for network node B (514) is calculated to be 6. The Maximum Permissible Rate (MPR) for network node C (516) is calculated to be 6 and the Maximum Permissible Rate (MPR) for network node D (518) is calculated to be 6. These MPR values are calculated using the formulas of FIG. 2B.

Furthermore, under the column "ACTUAL" (506) and in the cycle 3 row, the value "6" represents the number of transactions actually received by the Transaction Throttling Mechanism, or "TIM", which number of transactions represents the transactions transmitted by the plurality of applications to be processed by network node A (520) during cycle 2. In this example, the actual value measured for the number of transactions destined for network node B (522) is 6. The actual value measured for the number of transactions destined for network node C (524) is 6. The actual value measured for the number of transactions destined for network node D (526) is 6.

Furthermore, as can be seen in FIG. 5, in the cycle 3 row, under the column "ALLOWED" (508) and under network node A, the value "6" represents the number of transactions that the TTM actually allows to be processed by network node A (528) during cycle 3. The allowed number of transactions processed by network node B (530) is 6. The allowed number of transactions processed by network node C (532) is 6. The allowed number of transactions processed by network node D (534) is 6. For any particular network node, the allowed number of transactions is the lesser of the actual number of transactions received and the MPR for that network node during a given cycle Furthermore, under the column "TOTAL" (510) and the cycle 3 row, the value represents the total number of transactions admitted to be processed by all network nodes. The total value of transactions actually allowed for cycle 3 is calculated to be 24.

As shown in the Table of FIG. 5, under the column "MPR" (504) and in the cycle 4 row, the Maximum Permissible Rate (MPR) for network node A (512) is calculated to be 0. The Maximum Permissible Rate (MPR) for network node B (514) is calculated to be 0. The Maximum Permissible Rate (MPR) for network node C (516) is calculated to be 0 and the Maximum Permissible Rate (MPR) for network node D (518) is calculated to be 0. The aggressiveness of the throttling is shown here during cycle 4 by the shutting down of the permissible rate when certain conditions are encountered (which conditions are discussed in connection with FIG. 2B).

Furthermore, under the column "ACTUAL" (506) and in the cycle 4 row, the value "2" represents the number of transactions actually received by the Transaction Throttling Mechanism, or "TTM", which number of transactions represents the transactions transmitted by the plurality of applications to be processed by network node A (520) during cycle 4. In this example, the actual value measured for the number of transactions destined for network node B (522) is 3. The actual value measured for the number of transactions destined for network node C (524) is 4. The actual value measured for the number of transactions destined for network node D (526) is 5.

Furthermore, as can be seen in FIG. 5, in the cycle 4 row, under the column "ALLOWED" (508) and under network node A (528), the value "0" represents the number of transactions that the TTM actually allows to be processed by network node A during cycle 4. The allowed number of transactions processed by network node B (530) is 0. The allowed number of transactions processed by network node C (532) is 0. The allowed number of transactions processed by network node D (534) is 0. For any particular network node, the allowed number of transactions is the lesser of the actual number of transactions received and the MPR for that network node during a given cycle. Since the example of FIG. 5 relates to aggressive throttling, the allowed rate for each of network nodes A, B, C, and D during cycle 4 is zero.

Furthermore, under the column "TOTAL" (510) and the cycle 4 row, the value represents the total number of transactions admitted to be processed by all network nodes. The total value of transactions actually allowed for cycle 4 is calculated to be 0.

As shown in the Table of FIG. 5, under the column "MPR" (504) and in the cycle 5 row, the Maximum Permissible Rate (MPR) for network node A (512) is calculated to be 3. The Maximum Permissible Rate (MPR) for network node B (514) is calculated to be 3. The Maximum Permissible Rate (MPR) for network node C (516) is calculated to be 3 and the Maximum Permissible Rate (MPR) for network node D (518) is calculated to be 3. These MPR values are calculated using the formulas of FIG. 2B.

Furthermore, under the column "ACTUAL" (506) and in the cycle 4 row, the value "2" represents the number of transactions actually received by the Transaction Throttling Mechanism, or "TTM", which number of transactions represents the transactions transmitted by the plurality of applications to be processed by network node A (520) during cycle 5. In this example, the actual value measured for the number of transactions destined for network node B (522) is 3. The actual value measured for the number of transactions destined for network node C (524) is 4. The actual value measured for the number of transactions destined for network node D (526) is 5.

Furthermore, as can be seen in FIG. 5, in the cycle 5 row, under the column "ALLOWED" (508) and under network node A, the value "2" represents the number of transactions that the TTM actually allows to be processed by network node A (528) during cycle 5. The allowed number of transactions processed by network node B (530) is 3. The allowed number of transactions processed by network node C (532) is 3. The allowed number of transactions processed by network node D (534) is 3. For any particular network node, the allowed number of transactions is the lesser of the actual number of transactions received and the MPR for that network node during a given cycle.

Furthermore, under the column "TOTAL" (510) and the cycle 5 row, the value represents the total number of transactions admitted to be processed by all network nodes. The total value of transactions actually allowed for cycle 5 is calculated to be 11.

As it can be seen in FIG. 5, the values in the column "TOTAL" (510) represent the total number of transactions admitted to be processed by all network nodes. In cycle 1 the total number of transactions admitted to be processed is 9. In cycle 2 the total number of transaction processed is 8. In cycle 3 the total number of transactions admitted to be processed is 24. In cycle 4 the total number of transactions admitted to be processed is 0. Finally, in cycle 5 the total number of transactions admitted to be processed is 11.

As shown with the example of FIG. 5, aggressive adaptive throttling on a period-by-period basis can effectively control the traffic load across multiple network nodes. This is because over a period of time the total number of transactions actually admitted for processing will average out to be about the threshold default (e.g., 12 in the example of FIG. 5). In contrast to the conservative throttling case, however, traffic allowed into each network node for processing is more aggressively inhibited when certain conditions are encountered. Similar to the conservative throttling case, the amount of data exchanged among the network nodes to accomplish adaptive throttling is fairly minimal since only the peer allowed rate in the previous cycle is exchanged. Accordingly, network bandwidth overhead is minimized, leading to improved performance.

Figure 6A:
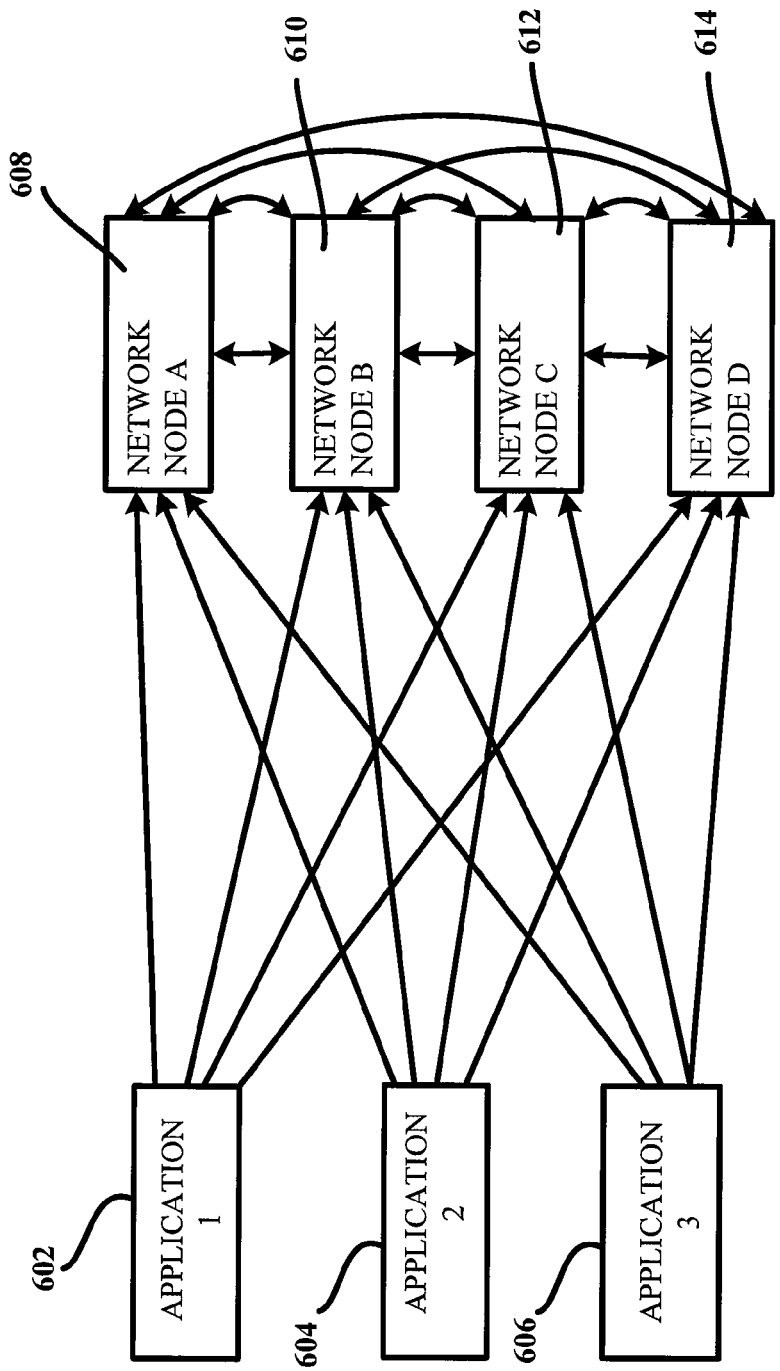
FIG. 6A is a block diagram describing an arrangement that implements traffic throttling in accordance with one embodiment, among others, of the present disclosure.

FIG. 6A shows, in accordance with an embodiment of the present disclosure, an arrangement that implements traffic throttling. As can be seen in FIG. 6A, traffic from applications 602, 604, and 606 may be throttled by one or more of network nodes 608, 610, 612, and 614. The throttling may be performed by software modules (not shown) residing in the applications and/or the network nodes to perform traffic throttling in accordance with the techniques disclosed herein. For example, software modules may be provisioned in one or more of applications 602, 604, and 606 to perform traffic throttling. As another example, software modules may be provisioned in one or more of network nodes 608, 610, 612, and 614 to perform traffic throttling. These software modules may communicate with one another to exchange allowed traffic rates in the past cycle in order to coordinate traffic throttling.

For completeness, a plurality of arrows depicting communication paths among network nodes 608, 610, 612, and 614 are shown to signify that the network nodes can exchange data regarding traffic usage by the applications when traffic throttling is performed by the network nodes. It should be kept in mind that although the traffic throttling has been discussed for traffic from individual applications, such throttling may be performed on any type or class of transactions. By way of example, traffic throttling may be performed based on a certain type of traffic from one or more of the applications or may be based on traffic from one or more users. Further, traffic throttling may be performed on a combination of specific users and/or specific application request types. As another example, traffic throttling may be performed for traffic that is exchanged with only certain types or classes of applications.

Accordingly, any combination of users and/or request types and/or other parameters may be specified to be throttled.

Figure 6B:
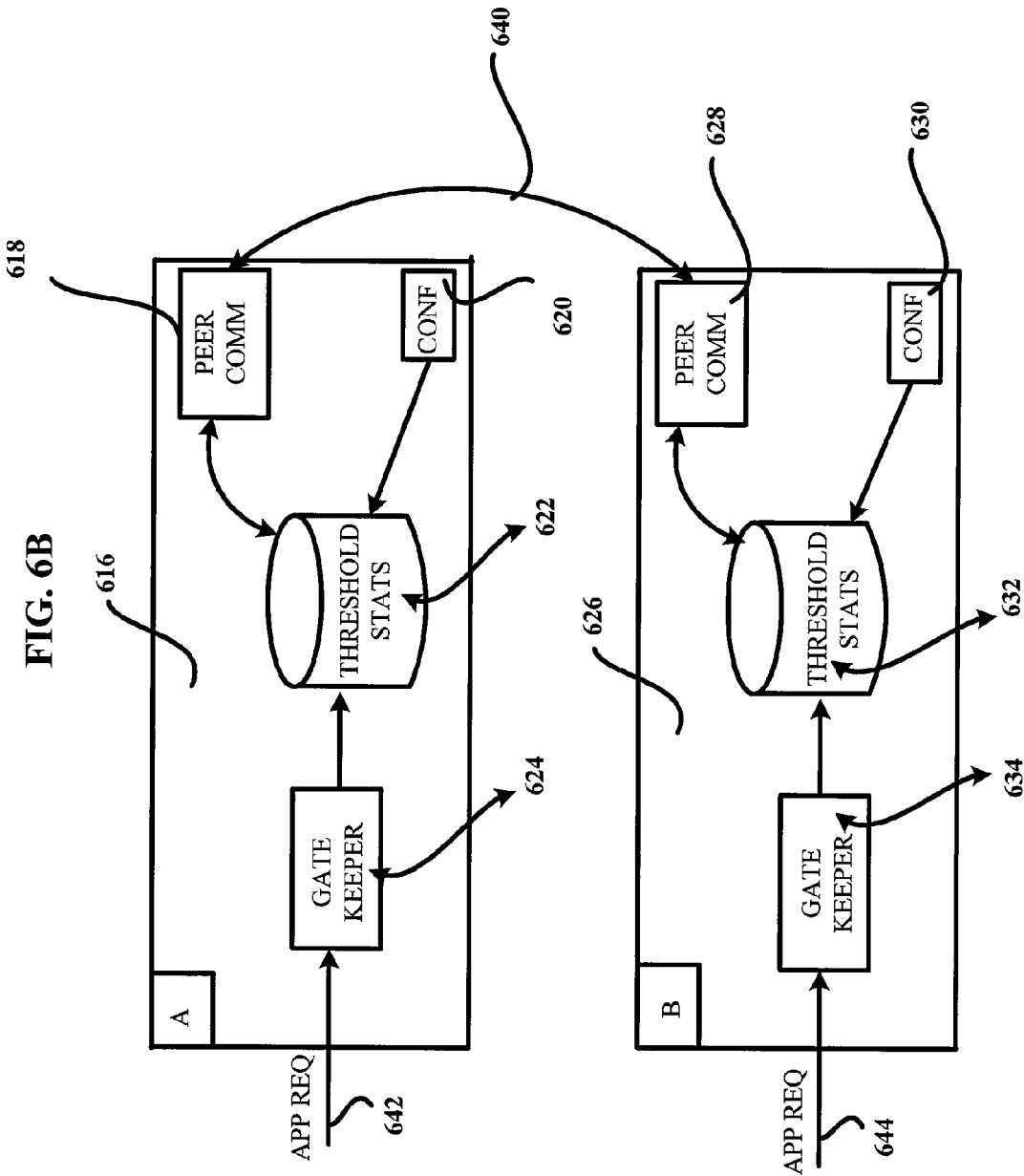
FIG. 6B is a block diagram describing a traffic throttling implementation in network nodes in accordance with one embodiment, among others, of the present disclosure.

FIG. 6B shows, in accordance with an embodiment of the present disclosure, a traffic throttling implementation in network nodes. As can be seen in FIG. 6B, network node 616 includes a gatekeeper 624, representing the mechanism that either allows or inhibits traffic. A configuration block 620 holds the programmable or preset threshold value TV (e.g., 12 for total admitted traffic 318 from the applications in the example of FIG. 3). An arrow 640 shows the communication path between peer communication module 618 and peer communication module 628 of a peer network node 626.

Based on this configuration value TV and the peer traffic rates from peer network nodes for the last communication cycle (obtained via peer communication module 618), the MPR value for the network node is set to govern the traffic admittance rate in the current cycle for network node 616. These traffic rate values are computed in threshold stats block 622 in the example of FIG. 6B. The calculation of the MPR values for both the aggressive throttling case and the non-aggressive throttling case for a given network node have been discussed earlier and will not be repeated here. Also, reference number 642 depicts the incoming traffic for network node 616 while reference number 644 depicts the incoming traffic for network node 626.

In the peer network node 626, gatekeeper block 634, threshold stats block 632 and configuration block 630 perform various functions for network node 626, which functions are analogous to functions performed by counterpart blocks in network node 616. Based on this configuration value, the traffic rates from peer network nodes (obtained from peer communication module 628) and in some cases the traffic rate from past cycle, the MPR value for the network node is set to govern the incoming traffic rate in the current cycle for network node 626. These traffic rate values are computed in threshold stats block 632 in the example of FIG. 6B. The calculation of the MPR values for both the aggressive throttling case and the non-aggressive throttling case has been discussed earlier and will not be repeated here.

As can be appreciated from the foregoing, adaptive throttling on a period-by-period basis can effectively control the traffic load across multiple network nodes. For both the aggressive and conservative traffic throttling case, the amount of data exchanged among the network nodes to accomplish adaptive throttling is fairly minimal since only the peer allowed rate in the previous cycle is exchanged. Accordingly, network bandwidth overhead is minimized, leading to improved performance.

Figure 7:
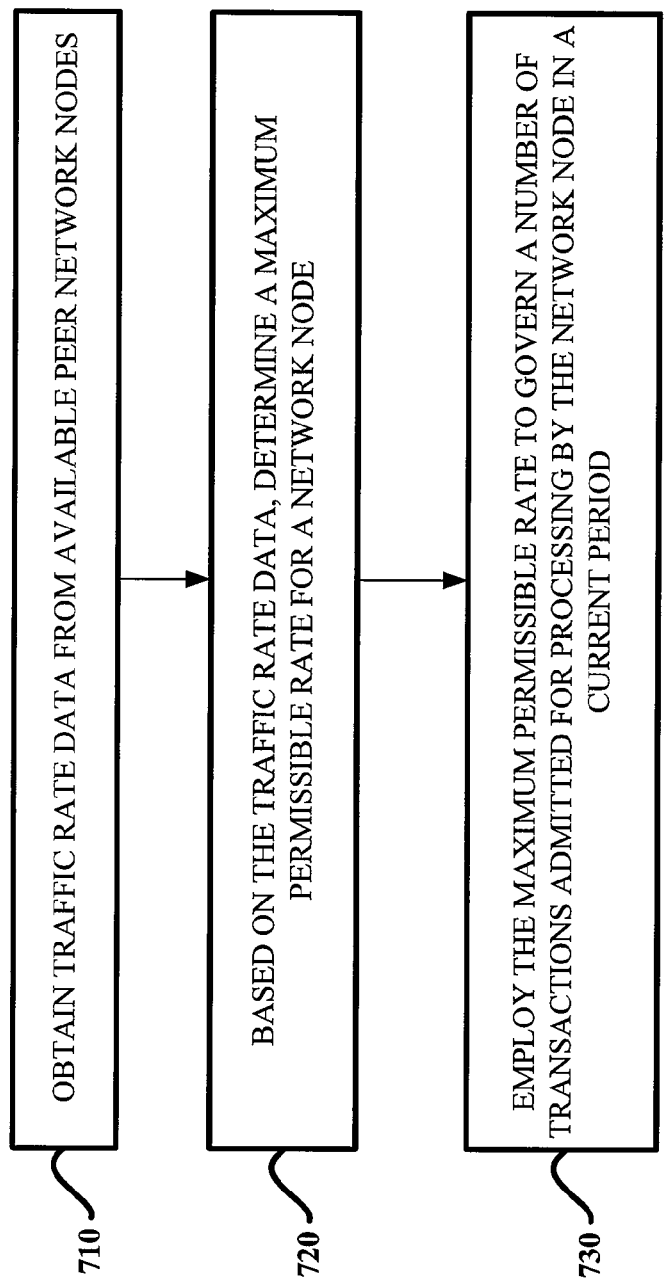
FIG. 7 is a flow chart diagram showing operation of a possible implementation of the traffic throttling implementation of one embodiment of the present disclosure.

The flow chart of FIG. 7 shows the architecture, functionality, and operation of one embodiment, among others, of the traffic throttling implementation of FIG. 6B. In this regard, each block represents a module, segment, or portion of code, which comprises one or more executable instructions for implementing the specified logical function(s). It should also be noted that in some alternative implementations, the functions noted in the blocks may occur out of the order noted in FIG. 7. For example, two blocks shown in succession in FIG. 7 may in fact be executed substantially concurrently or the blocks may sometimes be executed in the reverse order, depending upon the functionality involved, as will be further clarified hereinbelow.

In block 710, traffic rate data from available peer network nodes is obtained by a peer communication module 628. Based on the traffic rate data obtained by the peer communication module 628, a maximum permissible rate for a network node is determined (720) by a threshold stats block or module 622. The maximum permissible rate represents a maximum number of transactions permitted to pass into that network node for processing during a current period. The gatekeeper module 624 employs (730) the maximum permissible rate to govern a number of transactions admitted for processing by the network node in the current period.

While this present disclosure has been described in terms of several embodiments, there are alterations, permutations, and equivalents, which fall within the scope of this disclosure. Also, the title, summary, and abstract are provided herein for convenience and should not be used to construe the scope of the claims herein. Further, in this application, a set of "n" refers to one or more "n" in the set. It should also be noted that there are many alternative ways of implementing the methods and apparatuses of the present disclosure. It is therefore intended that the following appended claims be interpreted as including all such alterations, permutations, and equivalents as fall within the true spirit and scope of the present disclosure.

Therefore, having thus described the invention, at least the following is claimed:

1. A method comprising:
   obtaining traffic rate data from available peer network nodes that specifies a number of transactions accepted for processing by each of said peer network nodes during a time period;
   computing a maximum permissible rate for a network node based on the traffic rate data from the peer network nodes, wherein the maximum permissible rate represents a maximum number of transactions permitted to pass into that network node for processing during a current period; and
   employing the maximum permissible rate to govern a number of transactions admitted for processing by the network node in the current period,
   wherein the maximum permissible rate is based on a total threshold value of admitted transactions for network nodes as a whole in a current period minus traffic rates allowed in a prior period for the peer network nodes.

2. The method of claim 1, wherein each of the peer network nodes compute a maximum permissible rate to be applied for its own use.

3. The method of claim 1, wherein the total threshold value is configurable.

4. The method of claim 1, wherein implementation of governing of the number of transactions admitted for processing by the network node is activated based on which users make a transaction request.

5. The method of claim 1, wherein implementation of governing of the number of transactions admitted for processing by the network node is activated based on which type of application makes a transaction request.

6. The method of claim 1, further comprising:
   inhibiting or allowing a transaction to be processed based on whether the maximum permissible rate for a current period has been satisfied for the network node.

7. A system comprising:
   a peer communication module configured to obtain traffic rate data from available peer network nodes that specifies a number of transactions accepted for processing by each of said peer network nodes during a time period;
   a threshold stats module configured to compute a maximum permissible rate for a network node based on the traffic rate data from the peer network nodes, wherein the maximum permissible rate represents a maximum number of transactions permitted to pass into that network node for processing during a current period; and a gatekeeper module configured to employ the maximum permissible rate to govern a number of transactions admitted for processing by the network node in a current period, wherein the maximum permissible rate is based on a total threshold value of admitted transactions for network nodes as a whole in a current period minus traffic rates allowed in a prior period for the peer network nodes.

8. The system of claim 7, wherein the system is located at the network node.

9. The system of claim 7, wherein the maximum permissible rate is based on a total threshold value of admitted transactions for network nodes as a whole in a current period and further based on traffic rates allowed in a prior period for the peer network nodes.

10. The system of claim 9, wherein the total threshold value is configurable.

11. The system of claim 7, wherein implementation of governing of the number of transactions admitted for processing by the network node is activated based on which users make a transaction request.

12. The system of claim 7, wherein implementation of governing of the number of transactions admitted for processing by the network node is activated based on which type of application makes a transaction request.

13. The system of claim 7, wherein the gatekeeper module is further configured to: inhibit or allow a transaction to be processed based on whether the maximum permissible rate for a current period has been satisfied for the network node.

14. The system of claim 7, wherein each network node comprises a server and the network nodes together form a server farm.

15. A system comprising:
means for obtaining traffic rate data from available peer network nodes;
means for computing a maximum permissible rate for a network node based on the traffic rate data from the peer network nodes, wherein the maximum permissible rate represents a maximum number of transactions permitted to pass into that network node for processing during a current period; and
means for employing the maximum permissible rate to govern a number of transactions admitted for processing by the network node in the current period;
wherein the maximum permissible rate is based on a total threshold value of admitted transactions for the network nodes as a whole in a current period minus traffic rates allowed in an immediately previous period for the peer network nodes.

16. The system of claim 15, wherein each of the peer network nodes compute a maximum permissible rate to be applied for its own use.

17. The system of claim 15, wherein implementation of governing of the number of transactions admitted for processing by the network node is activated based on which users make a transaction request.

18. The system of claim 15, wherein implementation of governing of the number of transactions admitted for processing by the network node is activated based on which type of application makes a transaction request.

19. The system of claim 15, further comprising;
means for inhibiting or allowing a transaction to be processed based on whether the maximum permissible rate for a current period has been satisfied for the network node.

* * * * *

UNITED STATES PATENT AND TRADEMARK OFFICE
CERTIFICATE OF CORRECTION

PATENT NO. : 8,553,573 B2  
APPLICATION NO. : 12/594245  
DATED : October 8, 2013  
INVENTOR(S) : Vasu Sasikanth Sankhavaram Page 1 of 1

It is certified that error appears in the above-identified patent and that said Letters Patent is hereby corrected as shown below:

In the Claims:

In column 22, line 28, in Claim 19, delete "comprising;" and insert -- comprising: --, therefor.

Signed and Sealed this
Thirty-first Day of December, 2013

Margaret A. Focarino
*Commissioner for Patents of the United States Patent and Trademark Office*